US012592455B2

(12) United States Patent　　　(10) Patent No.: US 12,592,455 B2
Choi　　　　　　　　　　　　　　　(45) Date of Patent: Mar. 31, 2026

(54) HIGH-VOLTAGE BATTERY MODULE INCLUDING OUTER BRIDGE BUS BAR

(71) Applicant: LG Energy Solution, Ltd., Seoul (KR)

(72) Inventor: Jong Woon Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 885 days.

(21) Appl. No.: 17/775,445

(22) PCT Filed: Oct. 14, 2020

(86) PCT No.: PCT/KR2020/013961
§ 371 (c)(1),
(2) Date: May 9, 2022

(87) PCT Pub. No.: WO2021/096074
PCT Pub. Date: May 20, 2021

(65) Prior Publication Data
US 2022/0393309 A1　　Dec. 8, 2022

(30) Foreign Application Priority Data

Nov. 15, 2019　(KR) ........................ 10-2019-0146881

(51) Int. Cl.
*H01M 50/507*　　(2021.01)
*H01M 50/211*　　(2021.01)
*H01M 50/503*　　(2021.01)
(52) U.S. Cl.
CPC ....... *H01M 50/507* (2021.01); *H01M 50/211* (2021.01); *H01M 50/503* (2021.01)

(58) Field of Classification Search
CPC . H01M 50/507; H01M 50/211; H01M 50/503
See application file for complete search history.

(56) References Cited

U.S. PATENT DOCUMENTS

2010/0247996 A1　9/2010　Ijaz et al.
2010/0247997 A1　9/2010　Hostler et al.
(Continued)

FOREIGN PATENT DOCUMENTS

CN　　101952924 A　　1/2011
CN　　214203910 U　　9/2021
(Continued)

OTHER PUBLICATIONS

English Translation of Lee et al. (WO 2018124494 A2) (Year: 2018).*
(Continued)

*Primary Examiner* — Brian R Ohara
*Assistant Examiner* — Emily Elizabeth Freeman
(74) *Attorney, Agent, or Firm* — Lerner David LLP

(57) ABSTRACT

Disclosed herein is a high-voltage battery module including a bridge bus bar configured to be exposed to the outside in order to reduce a danger of accident due to electric shock when handing the high-voltage battery module, wherein a cell assembly is temporarily electrically open-circuited and the bridge bus bar is connected only when the battery module is used. It is possible to remove dangerous factors that may injure the human body during manufacture and transportation of the high-voltage battery module and to use the high-voltage battery module in the state in which restrictions are minimized.

6 Claims, 4 Drawing Sheets

(56) References Cited

U.S. PATENT DOCUMENTS

| | | |
|---|---|---|
| 2010/0247998 A1 | 9/2010 | Hostler et al. |
| 2010/0247999 A1 | 9/2010 | Ijaz et al. |
| 2010/0248010 A1 | 9/2010 | Butt et al. |
| 2011/0059342 A1 | 3/2011 | Lee et al. |
| 2012/0196170 A1 | 8/2012 | Ijaz et al. |
| 2013/0330594 A1 | 12/2013 | Soleski et al. |
| 2014/0099524 A1 | 4/2014 | Furuya et al. |
| 2018/0248166 A1 | 8/2018 | Ryu et al. |
| 2019/0259992 A1 | 8/2019 | Ligabue et al. |
| 2019/0348720 A1 | 11/2019 | Oh et al. |
| 2019/0389318 A1 | 12/2019 | Lee et al. |
| 2020/0014005 A1 | 1/2020 | Lee et al. |
| 2020/0266398 A1 | 8/2020 | Choi et al. |
| 2020/0350547 A1 | 11/2020 | Chi et al. |
| 2020/0388814 A1 | 12/2020 | Jang et al. |
| 2020/0411924 A1 | 12/2020 | Yun |
| 2021/0126313 A1 | 4/2021 | Lee et al. |

FOREIGN PATENT DOCUMENTS

| | | | |
|---|---|---|---|
| EP | 3528311 | A1 | 8/2019 |
| EP | 4002574 | A1 | 5/2022 |
| JP | 2002-343331 | A | 11/2002 |
| JP | 2013-026059 | A | 2/2013 |
| KR | 20140036880 | A | 3/2014 |
| KR | 20140064093 | A | 5/2014 |
| KR | 20140077811 | A | 6/2014 |
| KR | 20150070701 | A | 6/2015 |
| KR | 20160052018 | A | 5/2016 |
| KR | 20170100330 | A | 9/2017 |
| KR | 20180097897 | A | 9/2018 |
| KR | 20180099437 | A | 9/2018 |
| KR | 20190040402 | A | 4/2019 |
| KR | 20190063109 | A | 6/2019 |
| KR | 20190107900 | A | 9/2019 |
| KR | 20190114406 | A | 10/2019 |
| KR | 20190115940 | A | 10/2019 |
| WO | 2018124494 | A2 | 7/2018 |
| WO | 2019190072 | A1 | 10/2019 |

OTHER PUBLICATIONS

Diandong, C. et al., "Pure Electric Vehicles Basis", Changjiang Publishing & Media Hubei Science & Technology Press (Apr. 2018). 6 pgs.

Search Report dated Aug. 10, 2022 from Office Action for Chinese Application No. 202011262741 issued Aug. 18, 2022. 3 pgs.

Extended European Search Report including Written Opinion for Application No. 20886274.8 dated Nov. 24, 2022, pp. 1-9.

International Search Report for PCT/KR2020/013961 dated Jan. 27, 2021. 3 pgs.

* cited by examiner

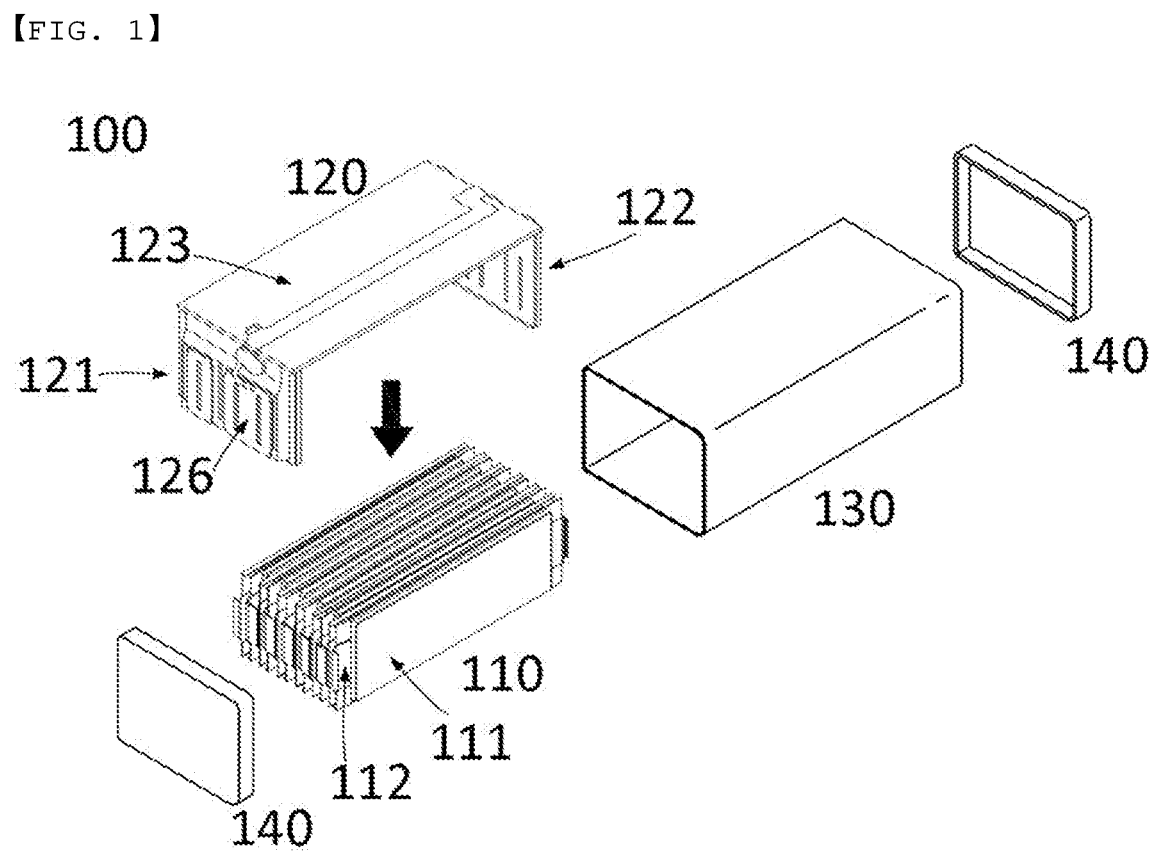

【FIG. 1】

【FIG. 2】
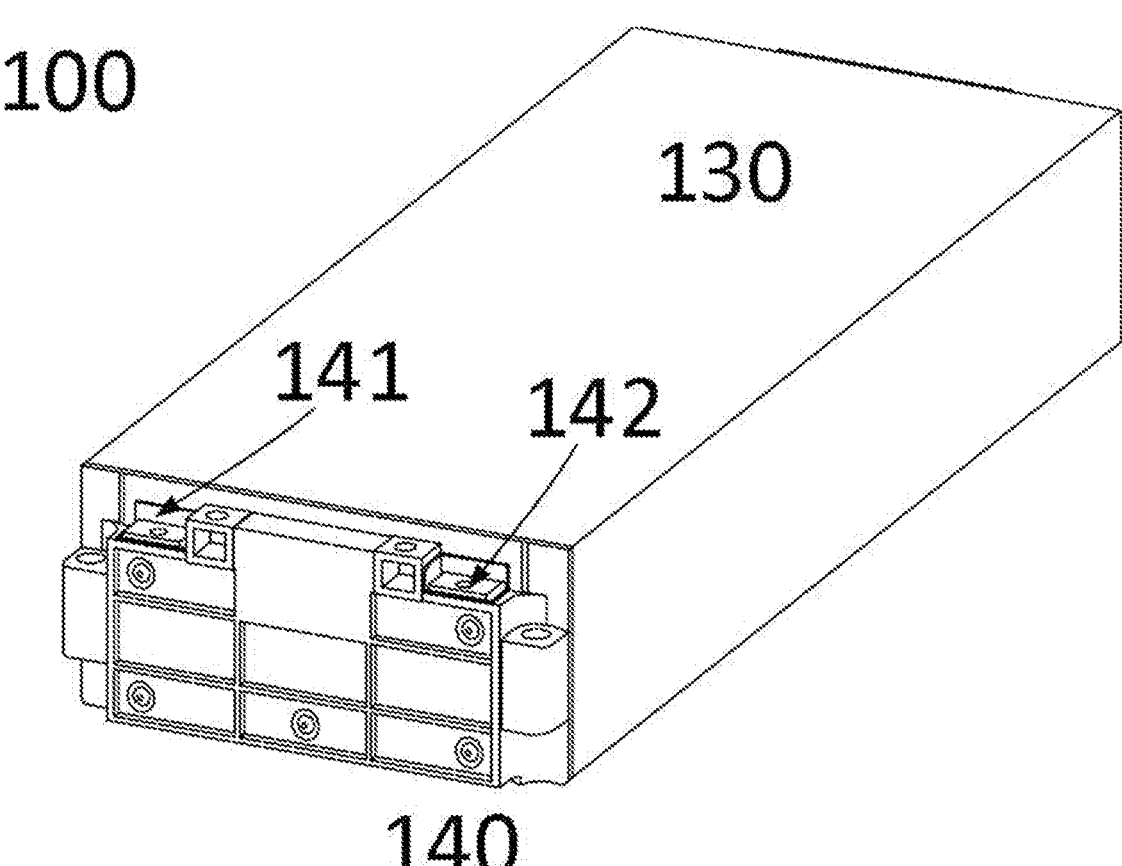

【FIG. 3】
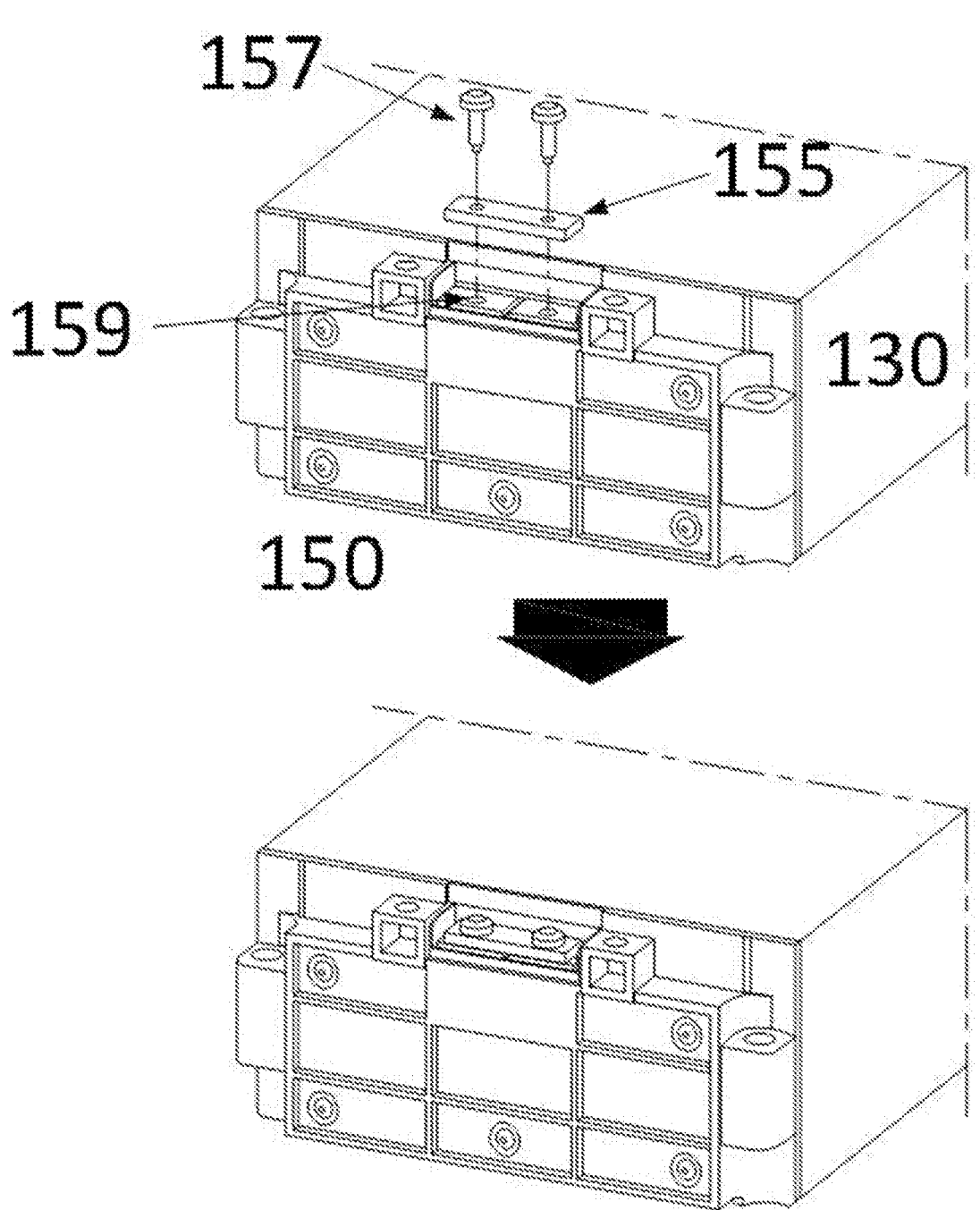

【FIG. 4】
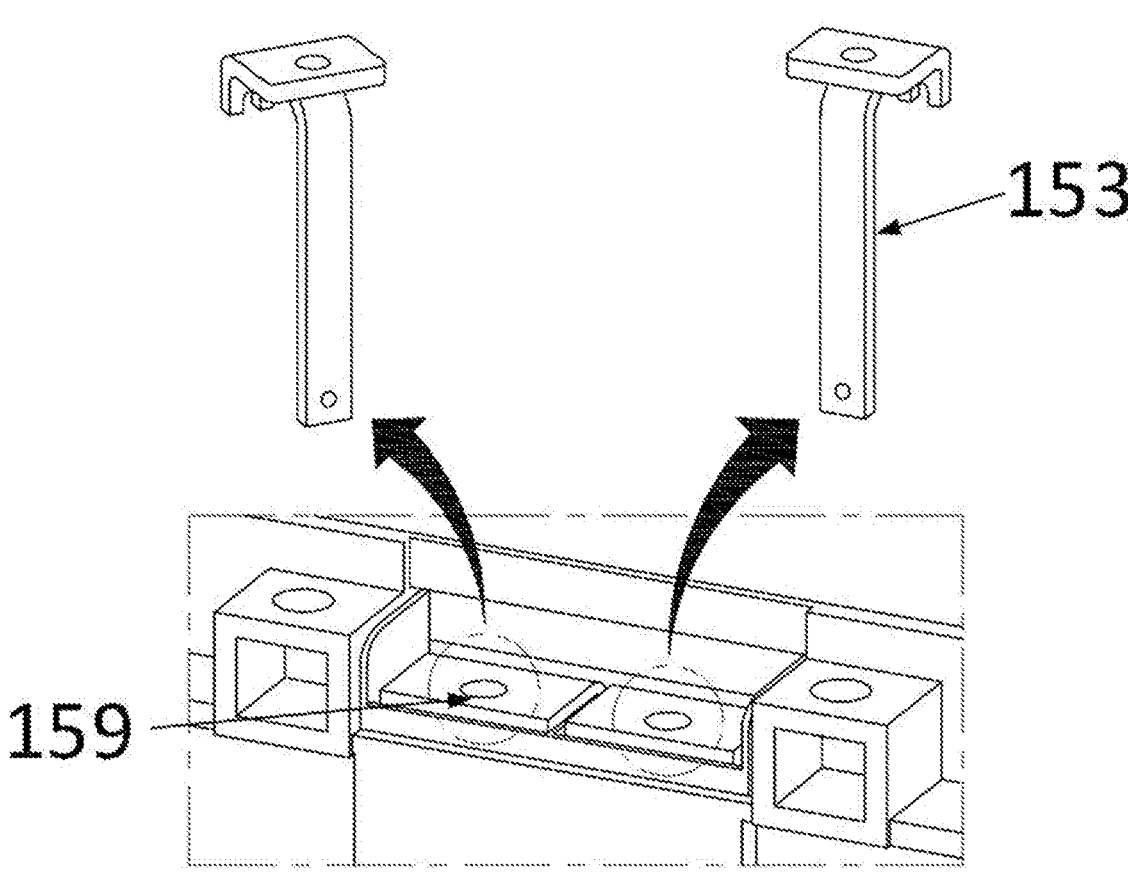

HIGH-VOLTAGE BATTERY MODULE INCLUDING OUTER BRIDGE BUS BAR

CROSS-REFERENCE TO RELATED APPLICATIONS

This application is a national stage entry under 35 U.S.C. § 371 of International Application No. PCT/KR2020/013961, filed on Oct. 14, 2020, published in Korean, which claims priority to Korean Patent Application No. 10-2019-0146881, filed on Nov. 15, 2019, the disclosures of which are hereby incorporated by reference herein in their entireties.

TECHNICAL FIELD

The present invention relates to a high-voltage battery module including an outer bridge bus bar, and more particularly to a high-voltage battery module of 60V or higher to which an outer bridge bus bar structure is applied.

BACKGROUND ART

Unlike small-sized mobile devices, such as smartphones, middle- or large-sized devices, such as electric vehicles, require a high-output, large-capacity battery. A secondary battery applied to electric vehicles is generally used in a form in which a plurality of secondary battery cells (hereinafter referred to as "cells") is assembled. The secondary battery is used in the form of a battery module in which a plurality of cells is connected to each other in series/parallel or in the form of a battery pack in which a plurality of battery modules is coupled to each other.

For a battery module used in electric vehicles, a plurality of cells is connected to each other in series, in parallel, or in series and parallel in order to provide output and capacity required by middle- or large-sized devices. In addition, the structure of the battery module must be stably maintained against vibration and impact in consideration of the characteristics of the vehicles.

Patent Document 1 discloses a conventional middle- or large-sized battery module, wherein electrode leads of a plurality of cells in the battery module are fixed to a plurality of bus bars, each of which is provided in the form of a metal plate, in the state of being electrically connected thereto.

Patent Document 1 discloses a mono frame type battery module, in which bus bars and a sensing means are mounted to a cell assembly constituted by stacked cells, and all thereof are received in a mono frame provided in the form of a quadrangular pipe. For such a mono frame type battery module, pouch-shaped battery cells, which are very easy to stack, are mainly used.

In Patent Document 1, the battery module includes a cell assembly constituted by stacked pouch-shaped secondary battery cells, each of the cells having electrode leads formed in opposite directions, a bus bar frame constituted by a first vertical plate and a second vertical plate, disposed at opposite sides of the cell assembly corresponding to the positions of the electrode leads of each of the cells, and an upper plate connected to the first vertical plate and to the second vertical plate, the upper plate being disposed above the cell assembly, and a mono frame configured to allow the cell assembly, to which the bus bar frame is mounted, to be disposed in a space defined therein by insertion thereinto, the mono frame being formed in the shape of a quadrangular pipe.

FIG. 1 is an exploded perspective view schematically showing the structure of a conventional battery module.

Referring to FIG. 1, the battery module 100 includes a cell assembly 110 constituted by stacked cells 111, each of the cells having electrode leads 112 formed in opposite directions; a bus bar frame 120 constituted by a first vertical plate 121 and a second vertical plate 122, disposed at opposite sides of the cell assembly 110 corresponding to the positions of the electrode leads 112 of each of the cells 111, and an upper plate 123 connected to the first vertical plate 121 and to the second vertical plate 122, the upper plate being disposed above the cell assembly 110; and a mono frame 130 configured to allow the cell assembly 110, to which the bus bar frame 120 is mounted, to be disposed in a space defined therein by insertion thereinto, the mono frame being formed in the shape of a quadrangular pipe. Side frames 140 are coupled to the mono frame 130, whereby the battery module 100 is completed.

A plurality of bus bars 126 is provided at the outer surface of each of the first vertical plate 121 and the second vertical plate 122, and each of the electrode leads 112 of the cells 111 is electrically connected to a corresponding one of the bus bars 126 through a corresponding one of slots formed in the first vertical plate 121 and the second vertical plate 122.

FIG. 2 is a front perspective view showing a first side frame 140 of the conventional battery module 100. Final input and output terminals 141 and 142 are provided at the first side frame 140. The final input and output terminals 141 and 142 may be provided by protruding some of the bus bars 126 or by inserting separate bus bars into some of the bus bars 126.

Battery modules have been applied to middle- or large-sized vehicles, such as trucks, in addition to small-sized vehicles. As a result, the outputs of the battery modules have also been increased, and therefore high-voltage battery modules of 60V or higher have been used in recent years. In this case, voltage provided through the final input and output terminals is 60V, whereby a danger of accident greatly increases compared to conventional battery modules.

There are current, current flow time, and current flow paths as factors that determine the degree of disaster due to electric shock. However, the most important factor is current, rather than voltage. When alternating current flows in a human body, the human body may suffer considerable pain at a current of 5 mA, and death may occur at a current of 50 mA.

In general, the skin of the human body has a resistance value of about 4,000Ω when the skin is dry, and the resistance value is reduced to about 2,000Ω when the skin is wet. In the case in which the human body receives electric shock at a voltage of 100V, a current of 25 mA flows in the human body when the skin is dry, and a current of 50 mA flows in the human body when the skin is wet. In the case in which a current of 10 to 20 mA or higher flows in the human body, the muscles of the human body become stiff, whereby it is not possible for the human body to escape from the place at which the human body receives the electric shock.

In the case in which the voltage of a conventional battery module is 25V and the human body is dry, a low current of 6.25 mA (25V/4000Ω) flows in the human body. Even in the case in which a worker comes into contact with the battery module, therefore, the worker may easily escape therefrom. In the case of a battery module of 60V, which has been introduced in recent years, however, a current of 15 mA or higher flows in the human body. In the case in which the worker receives electric shock, therefore, the muscles of the worker become stiff, whereby it is not possible for the worker to escape from the place at which the worker receives the electric shock.

Demand for high-voltage battery modules has gradually increased, and therefore there is a need for a plan capable of securing the safety of high-voltage battery modules, the danger of which has qualitatively greatly increased compared to conventional battery modules.

(Patent Document 1) Korean Patent Application Publication No. 2019-0114406

DISCLOSURE

Technical Problem

The present invention has been made in view of the above problems, and it is an object of the present invention to provide a high-voltage battery module capable of removing dangerous factors that may injure the human body during manufacture and transportation of the high-voltage battery module and being used in the state in which restrictions are minimized.

Technical Solution

In accordance with an aspect of the present invention, the above and other objects can be accomplished by the provision of a battery module including a cell assembly constituted by stacked pouch-shaped secondary battery cells, each of the cells having electrode leads formed in opposite directions, a first vertical plate and a second vertical plate disposed at opposite sides of the cell assembly corresponding to the positions of the electrode leads of each of the cells, and a plurality of bus bars provided at each of the first vertical plate and the second vertical plate, each of the electrode leads of the cells being electrically connected to a corresponding one of the bus bars, wherein final input and output terminals of the battery module or bus bars connected to the final input and output terminals are disposed at the first vertical plate, and bus bars electrically separated from each other are disposed at the second vertical plate, the bus bars disposed at the second vertical plate in the state of being electrically separated from each other being connected to each other via a separate bridge bus bar.

The battery module may further include a bus bar frame constituted by an upper plate connected to the first vertical plate and the second vertical plate, the upper plate being disposed above the cell assembly, and a mono frame configured to allow the cell assembly having the bus bar frame mounted therein to be disposed in a space defined therein by insertion thereinto, the mono frame being formed in the shape of a quadrangular pipe.

The battery module may further include a first side frame and a second side frame coupled to the mono frame, the mono frame being configured to allow the cell assembly having the bus bar frame mounted therein to be disposed in the space defined therein by insertion thereinto, the mono frame being formed in the shape of the quadrangular pipe, the first side frame and the second side frame being configured to protect outer surfaces of the first vertical plate and the second vertical plate of the mono frame from the outside.

A bridge coupling unit configured to allow the bridge bus bar to be coupled thereto may be disposed at the upper end of the battery module. At this time, the bridge coupling unit may be provided at the upper end of the second vertical plate.

The bridge bus bar may be configured to electrically interconnect the bus bars disposed at the second vertical plate in the state of being electrically separated from each other by manipulation outside the battery module.

In addition, two or more bus bars may be disposed at the second vertical plate in the state of being electrically separated from each other. Correspondingly, the same number of bridge bus bars and bridge coupling units are provided.

In accordance with another aspect of the present invention, there is provided a battery pack including the battery module.

In accordance with a further aspect of the present invention, there is provided a method of using the battery module, wherein the bridge bus bar is not connected until electricity is supplied using the battery module.

The present invention may be provided in the state in which an arbitrary combination of the invention is possible.

BRIEF DESCRIPTION OF DRAWINGS

FIG. 1 is an exploded perspective view schematically showing the structure of a conventional battery module.

FIG. 2 is a front perspective view showing a first side frame of the conventional battery module.

FIG. 3 is a front perspective view showing a second side frame according to the present invention.

FIG. 4 is an enlarged view schematically showing a bridge coupling unit according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, the present invention will be described in more detail.

The present invention is an improvement to the second vertical plate and the second side frame of the conventional battery module, and a description will be given based thereon.

FIG. 3 is a front perspective view showing a second side frame according to the present invention.

FIG. 4 is an enlarged view schematically showing a bridge coupling unit according to the present invention.

The bridge coupling unit 159 is disposed at the upper end of the battery module. Portions of outer exposure bus bars that may extend from the bus bars of the second vertical plate 122 or may be connected to the bus bars of the second vertical plate 122 are located at the bridge coupling unit 159. In the upper figure of FIG. 3, the bus bars are electrically separated from each other.

The bus bars, which are separated from each other, are connected to each other via a bridge bus bar 155, which is flat and rectangular, and the bridge bus bar is fixed to the bus bars using assembly screws 157. The lower figure of FIG. 3 shows the state in which the above components are coupled to each other.

FIG. 4 shows the enlarged state of the bridge coupling unit 159. FIG. 4 shows an embodiment of outer connection bus bars 153, which are outer exposure bus bars that can be connected to the bus bars of the second vertical plate 122. Each of the outer connection bus bars 153 is made of a conductive material, is fixed to a corresponding upper protruding portion of the second vertical plate 122, which is made of a non-conductive material, and is connected to a bus bar directly connected to a corresponding one of the electrode leads of the second vertical plate 122. Each of the outer connection bus bars 153 may be manufactured as a separate part, or may be integrally formed with a bus bar directly connected to a corresponding one of the electrode leads of the second vertical plate 122.

In the present invention, 60V has been mentioned as an example, and only one bridge bus bar is shown in the drawings by way of example. In the case of higher voltage and in a high-humidity work environment, however, one or more bridge bus bars may be used even in a conventional low-voltage battery module in order to extend the range thereof.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

INDUSTRIAL APPLICABILITY

As is apparent from the above description, the present invention has been made in view of the above problems, and it is possible to provide a high-voltage battery module capable of removing dangerous factors that may injure the human body during manufacture and transportation of the high-voltage battery module and being used in the state in which restrictions are minimized. In particular, the present invention has an advantage in that the electrical connection of a cell assembly disposed in the battery module is divided into two or more parts before the cell assembly is used to finally supply electricity, whereby it is possible to reduce the voltage of the battery module to less than a voltage that may injure the human body.

DESCRIPTION OF REFERENCE NUMERALS

100: Battery module
110: Cell assembly
111: Cells
112: Electrode leads
120: Bus bar frame
121: First vertical plate
122: Second vertical plate
123: Upper plate

126: Bus bars
130: Mono frame
140: First side frame
141, 142: Final input and output terminals
150: Second side frame
153: Outer connection bus bars
155: Bridge bus bar
157: Assembly screws
159: Bridge coupling unit

The invention claimed is:

1. A battery module comprising:
a cell assembly including stacked pouch-shaped secondary battery cells, each of the pouch-shaped secondary battery cells having electrode leads extending in opposite directions;
a first vertical plate and a second vertical plate disposed at opposite sides of the cell assembly adjacent to positions of the electrode leads of each of the cells;
first bus bars and second bus bars provided at each of the first vertical plate and the second vertical plate, respectively, each of the electrode leads of each of the pouch-shaped secondary battery cells being electrically connected to a corresponding one of the bus bars;
a bus bar frame including an upper plate connected to the first vertical plate and the second vertical plate, the upper plate being disposed above the cell assembly; and
a mono frame extending around the cell assembly and the bus bar frame, the mono frame being formed in a quadrangular pipe shape,
wherein final input and output terminals of the battery module or the first bus bars connected to the final input and output terminals are exposed at the first vertical plate, and
the second bus bars are electrically separated from each other within the battery module, and each second bus bar has a part that is exposed at the second vertical plate and that is electrically separated from the second vertical plate, the second bus bars being configured to be connected to each other via a separate bridge bus bar,
wherein a bridge coupling unit configured to allow the bridge bus bar to be coupled thereto is disposed at an upper end of the battery module, the bridge coupling unit comprising portions of the second bus bars, and
wherein electrical connection of the cell assembly is divided into two or more parts due to the second bus bars being electrically separated from each other before the cell assembly is used to finally supply electricity, and
wherein the bridge bus bar is connected to the second bus bars after the cell assembly is located within the bus bar frame and the mono frame.

2. The battery module according to claim 1, further comprising a first side frame and a second side frame coupled to the mono frame, the mono frame and the first and second side frames together enclosing the cell assembly and the bus bar frame therein, the first side frame and the second side frame protecting outer surfaces of the first vertical plate and the second vertical plate from exposure to an outside of the battery module.

3. The battery module according to claim 1, wherein the bridge coupling unit is disposed at an upper end of the second vertical plate.

4. The battery module according to claim 1, wherein the bridge bus bar is configured to electrically interconnect the bus bars disposed at the second vertical plate in the state of being electrically separated from each other by manipulation outside the battery module.

5. A battery pack comprising the battery module according to claim 1.

6. A method of using the battery module according to claim 1, wherein the bridge bus bar is not connected until electricity is supplied using the battery module.

* * * * *